US00RE41793E

(19) United States
(12) Reissued Patent
Jolley et al.

(10) Patent Number: US RE41,793 E
(45) Date of Reissued Patent: Oct. 5, 2010

(54) BRACKET ASSEMBLY FOR MOUNTING A REED SWITCH AND ASSOCIATED MAGNET

(75) Inventors: Daniel M. Jolley, West Jordan, UT (US); William R. Carlson, Spanish Fork, UT (US)

(73) Assignee: Quick Switch Enterprises, LLC, Springville, UT (US)

(21) Appl. No.: 11/333,749

(22) Filed: Jan. 17, 2006

Related U.S. Patent Documents

Reissue of:
(64) Patent No.: 6,359,538
Issued: Mar. 19, 2002
Appl. No.: 09/659,862
Filed: Sep. 12, 2000

(51) Int. Cl.
*H01H 9/00* (2006.01)

(52) U.S. Cl. ..... 335/205
(58) Field of Classification Search ..... 335/151–154, 335/205–207
See application file for complete search history.

(56) References Cited

U.S. PATENT DOCUMENTS 3,803,575 A * 4/1974 Gotanda ..... 340/274
4,027,907 A * 6/1977 Crepinsek ..... 292/264
6,124,792 A 9/2000 Shoen et al.
6,249,224 B1 6/2001 Shoen et al.
6,977,570 B2 12/2005 Gilmore

OTHER PUBLICATIONS

U–Haul, UHICS–009, U–Haul Contact Installation Diagram, 1999, 1 page.
Security Dealer Access Control, Overhead Door Protection, Mar. 1998, p. 68.

* cited by examiner

*Primary Examiner*—Ramon M Barrera
(74) *Attorney, Agent, or Firm*—Thorpe North & Western LLP

(57) ABSTRACT

A bracket assembly for mounting a reed switch and associated magnet on an overhead opening door includes first and second interlocking pieces, both of which are stamped from sheet metal that is, preferably, non-ferromagnetic. Each of the pieces incorporates an opening sized to slidably receive a locking door bolt fabricated from a ferromagnetic material such as mild or hardened steel. For a currently preferred embodiment of the invention, both pieces of the bracket assembly are stamped from sheet aluminum. Both the reed switch and its associated magnet mount may mount on either piece, so long as they are on opposite sides of the opening. The assembly incorporates an opening that is sized to receive a slidable, locking bolt fabricated from a ferromagnetic material such as mild or hardened steel. When the bolt is withdrawn from the opening, the reed switch is activated, thereby generating a signal which can be input to a security system. For a preferred embodiment of the invention, both the reed switch and the magnet are adhesively bonded to the bracket assembly on opposite sides of the opening. The first and second pieces reversably snap together to form a box in which the reed switch and the magnet are enclosed. In order to install the bracket assembly on the rail of an overhead door track, screws or rivets are placed through both the first and second pieces and secured to the door track rail.

20 Claims, 7 Drawing Sheets

BRACKET ASSEMBLY FOR MOUNTING A REED SWITCH AND ASSOCIATED MAGNET

Matter enclosed in heavy brackets [ ] appears in the original patent but forms no part of this reissue specification; matter printed in italics indicates the additions made by reissue.

*CROSS REFERENCE TO RELATED APPLICATION*

*This Application is for a reissue of U.S. Pat. No. 6,359,538 B1, which was filed Sep. 12, 2000 and had an application Ser. No. 09/659,862.*

BACKGROUND OF THE INVENTION

1. Field of the Invention

This invention relates to magnetic reed switches and, more particularly, to brackets for mounting a reed switch and an associated magnet on the guide track of an overhead security door.

2. Description of Related Art

A reed switch is a mechanical electrical switch having a pair of ferromagnetic contacts in either a normally-open or normally-closed configuration. In the presence of a magnetic field, the contacts of a normally-open reed switch will close, while the contacts of a normally-closed reed switch will open. Reed switches are typically used as proximity sensors for limit, safety, and security applications.

The present invention is designed for security applications. Overhead security doors are generally mounted between two parallel tracks. For buildings having a height at least double the door height, the tracks may be entirely vertical. However, for buildings having a height less than double the door height, vertical tracks are used for the closed door position, and horizontal tracks are used for the open position. The vertical and horizontal tracks are interconnected by curved sections. As a general rule, overhead doors are secured by a pair of bolts which can be horizontally extended or retracted by rotating a locking handle coupled to both bolts. When the door is fully closed and the bolts are in their extended positions, one bolt is inserted within an aperture in one of the tracks, and the other bolt is inserted within an aperture in the opposite track.

What is needed is a bracket assembly for securely mounting a reed switch and its associated magnet on at least one of the tracks of an overhead door, such that the reed switch and magnet are on opposite sides of the bolt-receiving aperture of the track. If ferromagnetic bolts are employed to lock the door, the bolt will interfere with the magnetic field generated by the magnet so that the reed switch will be unaffected by the magnetic field as long as the bolt is in its locked position. When the bolt is withdrawn from the bolt-receiving aperture, the magnetic field acts on the reed switch to generate a signal. The bracket assembly should, ideally, provide an enclosure which will protect both the reed switch and the magnet from inadvertent mechanical damage. In addition, the bracket assembly should be relatively inexpensive manufacture and simple to install, and readily disassemblable for reed switch replacement.

SUMMARY OF THE INVENTION

The present invention fulfills the needs expressed in the background section, in that a bracket assembly for a reed switch and associated magnet is provided that securely mounts to an overhead door track. The assembly is relatively inexpensive to manufacture, simple to install, and readily disassemblable for reed switch or magnet replacement. The assembly also provides an enclosure which protects both the reed switch and the magnet from inadvertent mechanical damage, removal, or misaligning forces. The assembly incorporates an opening that is sized to receive a slidable, locking bolt fabricated from a ferromagnetic material such as mild or hardened steel. The assembly is designed such that the reed switch and magnet mount on opposite sides of the bracket assembly opening. With such an arrangement, the bolt will interfere with the magnetic field generated by the magnet so that the reed switch will be unaffected by the magnetic field as long as the bolt is positioned between the reed switch and the magnet. When the bolt is withdrawn from the bolt-receiving opening of the bracket assembly, the magnetic field acts on the reed switch to generate an electrical signal. Reed switches of both the normally-open and normally-closed varieties may be used in combination with the new bracket assembly. If a normally-open reed switch is used, then the alarm system is set when the switch is open. A closed circuit will trigger a security system alert. Likewise, if a normally-closed reed switch is used, then the alarm system is set when the switch is closed. An open circuit will trigger a security system alert.

The bracket assembly includes first and second interlocking pieces, both of which are stamped from sheet metal which is, preferably, non-ferromagnetic. Each of the pieces incorporates an opening sized to slidably receive a locking door bolt of a given size. For a currently preferred embodiment of the invention, both pieces of the bracket assembly are stamped from sheet aluminum. Both the reed switch and its associated magnet mount may mount on either piece, so long as they are on opposite sides of the opening. For a preferred embodiment of the invention, both the reed switch and the magnet each include a double-stick adhesive layer, one side of which can be exposed by peeling off an attached protective layer. The adhesive layers are employed to attach their associated components to either the first or second piece on either side of the bolt-receiving opening. The first and second pieces reversably snap together to form a box in which the reed switch and the magnet are enclosed. In order to install the bracket assembly on the rail of an overhead door track, screws or rivets are placed through both the first and second pieces and secured to the door track.

PREFERRED EMBODIMENT OF THE INVENTION

Figure 2:
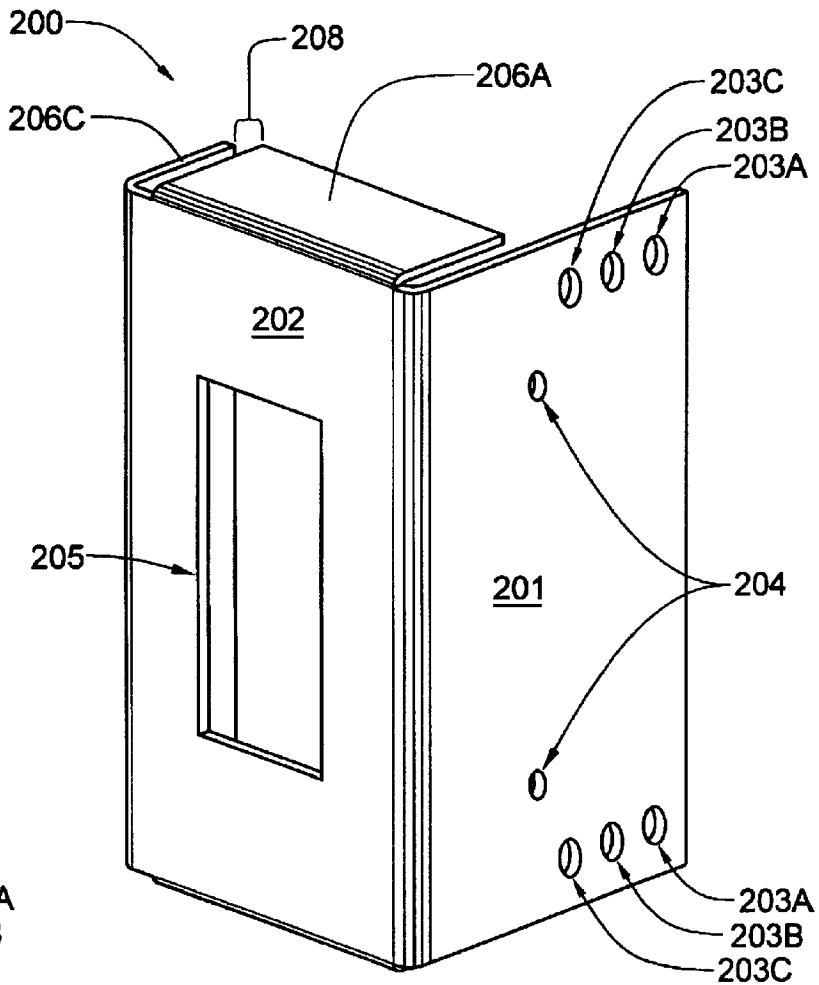
FIG. 2 is an isometric view of the exterior of the bracket assembly enclosure.
Figure 1:
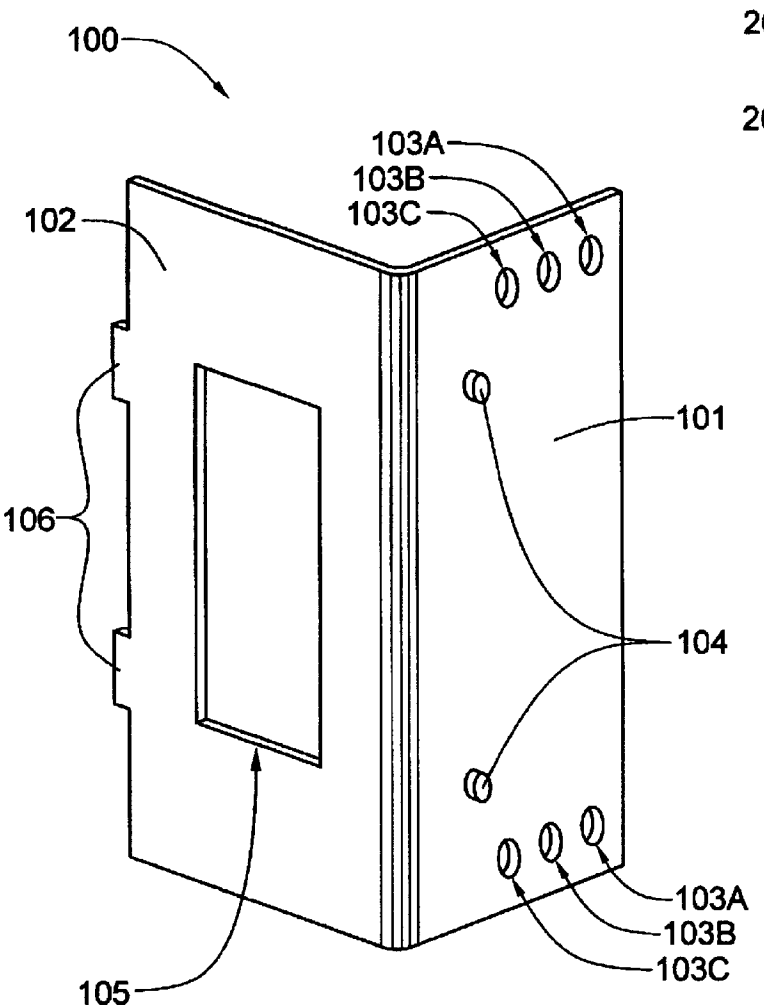
FIG. 1 is an isometric view of the inner surface of the bracket assembly cover plate.
Figure 4:
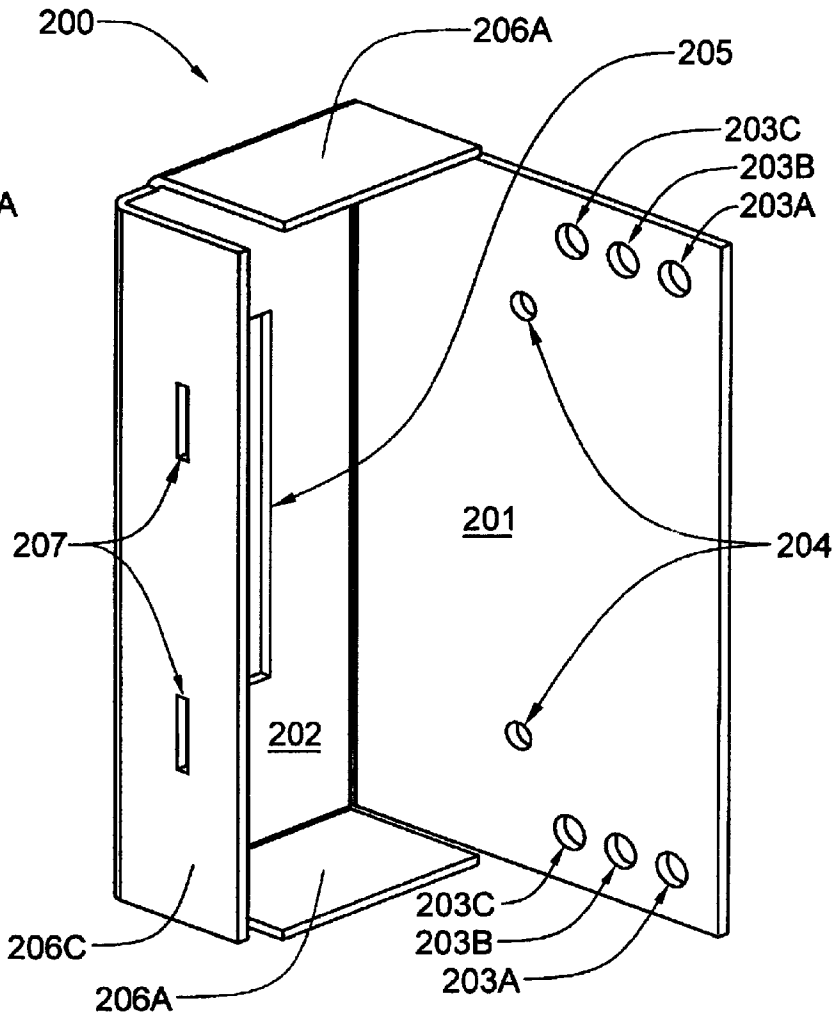
FIG. 4 is an isometric view of the exterior surface of the cover plate.
Figure 3:
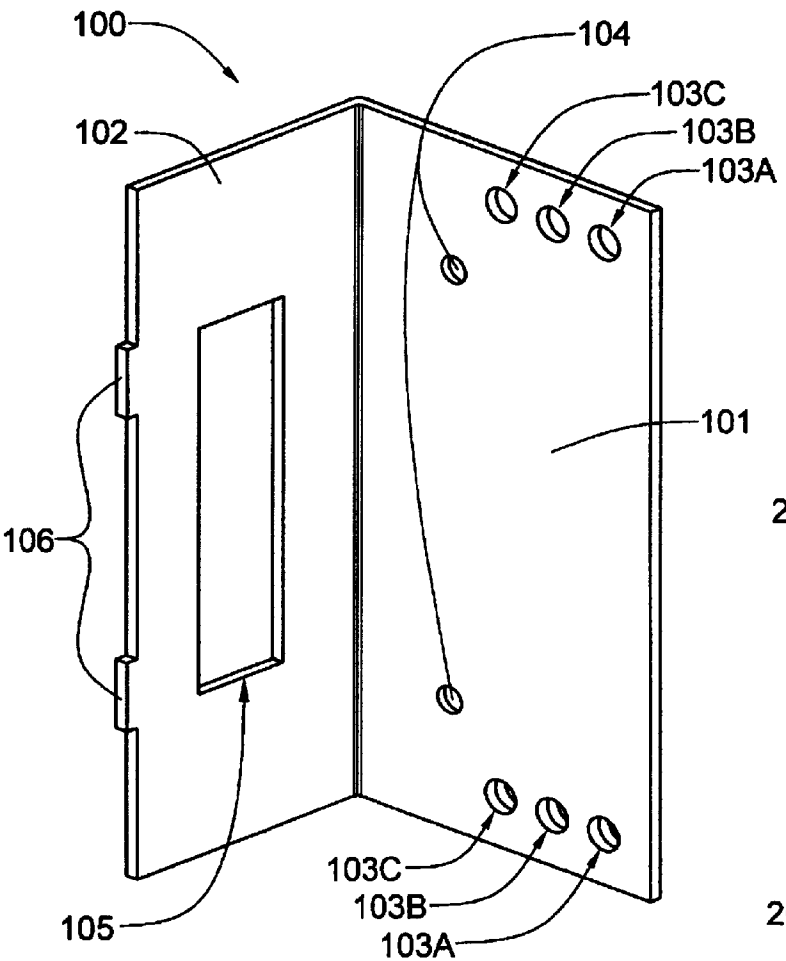
FIG. 3 is an isometric view of the interior of the bracket assembly enclosure.

A bracket assembly that securely mounts to a rail of an overhead-opening door track, and provides a protective enclosure for a reed switch and associated magnet will now be described in detail with reference to the attached drawing FIGS. 1–12.

Referring now to FIGS. 1 through 4, the bracket assembly is assembled from two components, a cover 100 and an walled enclosure 200, each of which is shown in a pair of views. As will be subsequently shown, the cover 100 nests with the walled enclosure 200 to form a complete assembly that is mountable to the rail of an overhead-opening door track. For a preferred embodiment of the invention, the cover 100 is formed from sheet aluminum having an optimum thickness of about 1.25 mm (0.050 in.). The cover has a mounting flange portion 101 coupled to a bolt receiving portion 102 by a 90-degree, minimum-radius bend. In this particular case, use of 1.25 mm-thick sheet results in bends having a radius to the stretched outer surface of about 2.25 mm (about 0.085 in.). The mounting flange portion 101 incorporates three sets of mounting holes (103A, 103B, and 103C) and a pair of punched protrusions 104. The walled enclosure 200 also includes a mounting flange portion 201 that is coupled to a bolt receiving portion 202. The mounting flange portion 201 of walled enclosure 200 also incorporates three sets of mounting holes 203A, 203B and 203C and a pair of circular apertures 204. The bolt receiving portion 102 of cover 100 incorporates a rectangular opening 105 for receiving a slidable bolt of rectangular cross section that is used to lock the door (not shown) to the rail in a closed position. The bolt receiving portion of walled enclosure 200 also incorporates a rectangular opening 205 for receiving the slidable bolt. It will be noted that the bolt receiving portion 202 of walled enclosure 200 also incorporates first second and third side panel portions 206A, 206B, and 206C, each of which is coupled to the bolt receiving portion 202 via a 90-degree bend. It will be noted that second side panel portion 206B incorporates a pair of slots 207, while the bolt receiving portion 102 of cover 100 incorporates a pair of tabs 106 along a longitudinal outer edge thereof.

Still referring to FIGS. 1 through 4, when the cover 101 is nested with the walled enclosure 200, the three sets of mounting holes on the cover 100 (103A, 103B and 103C) coincide with the three sets of mounting holes 203A, 203B, and 203C on the walled enclosure 200, the protrusions 104 snap into the corresponding circular apertures 204 in the walled enclosure 200, the rectangular opening 105 in the cover 100 aligns with the rectangular opening 205 of the walled enclosure, and the tabs 106 mate with slots 207 that are punched in the walled enclosure 200. In order to remove the cover 100 from the walled enclosure, it must be gently pried away from the walled enclosure 200 to disengage the protrusions 104 from the circular apertures 201.

It will also be noted that first and third side panel portions 104A and 204C do not extend along the entire adjacent edge of bolt receiving portion 202. The gap 208 at each end of the walled enclosure 200 provides an opening through which wires coupled to the internal reed switch may pass.

Figure 6:
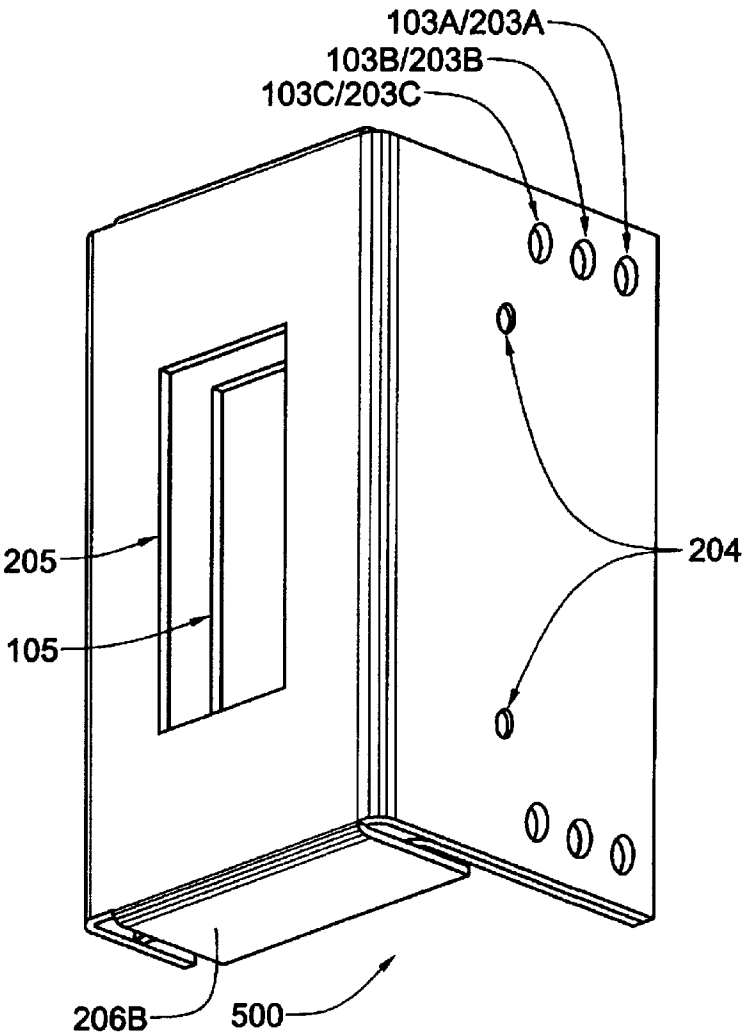
FIG. 6 is an isometric view of a fully-assembled bracket assembly from the enclosure side.
Figure 5:
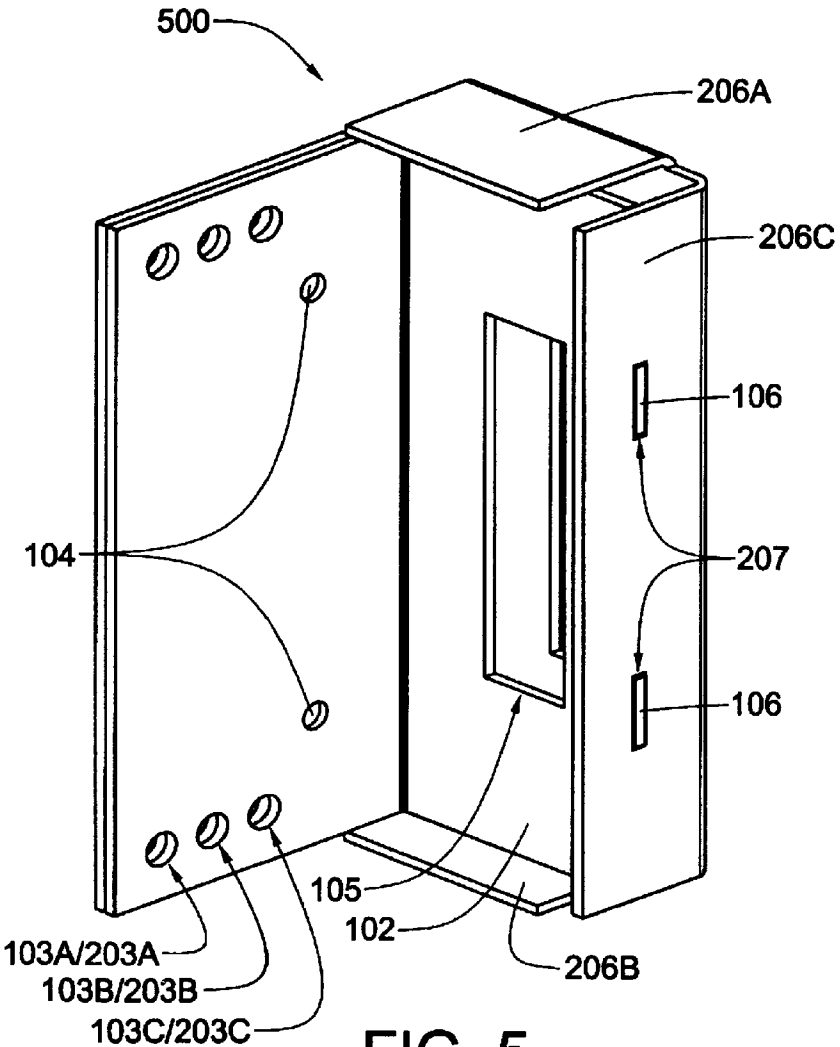
FIG. 5 is an isometric view of a fully-assembled bracket assembly from the cover plate side.
Figure 7:
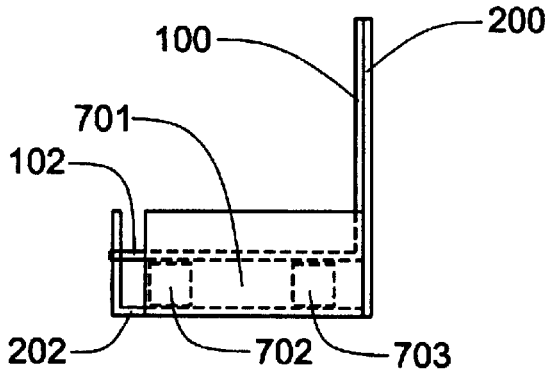
FIG. 7 is an see-through, top plan view of the assembled bracket assembly, the bottom plan view of the assembly being a mirror image thereof.
Figure 9:
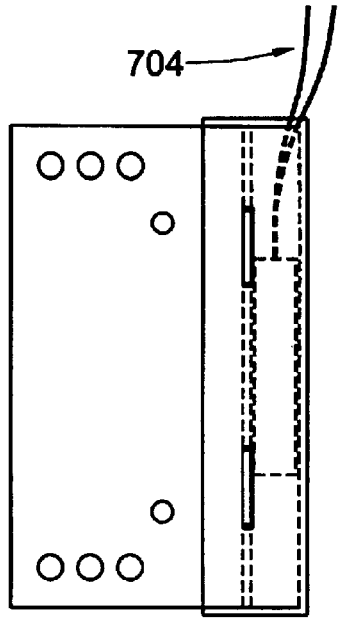
FIG. 9 is a see-through, elevational side view of the fully-assembled bracket assembly, showing the mounting flange from the rail-contacting side thereof.
Figure 8:
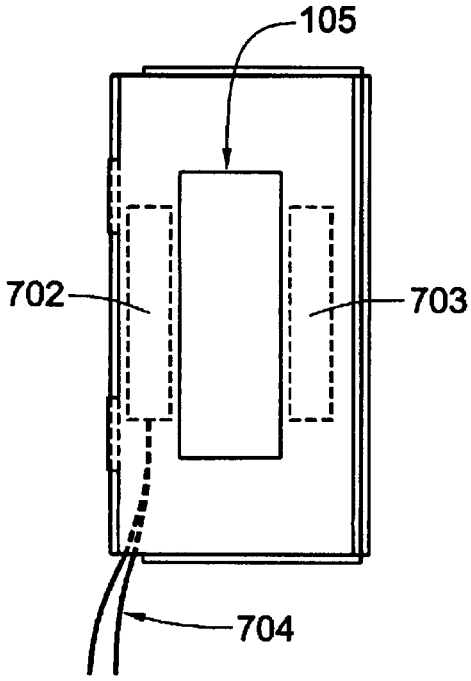
FIG. 8 is a see-through, elevational bolt-receiving side view of the fully-assembled bracket assembly.
Figure 10:
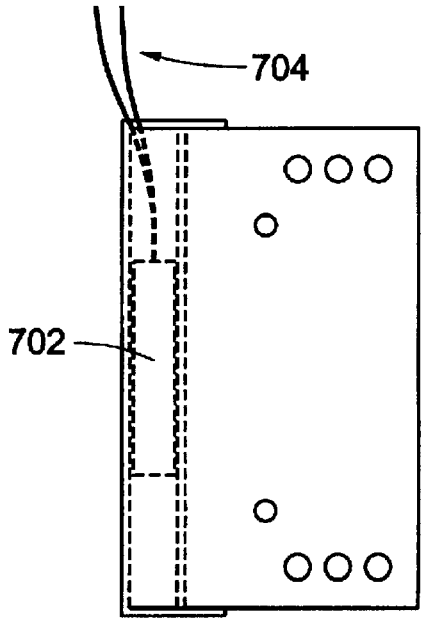
FIG. 10 is a see-through, elevational side view of the fully-assembled bracket assembly, showing the mounting flange from the fastener insertion side.

Referring now to FIGS. 5 and 6, which are different views of the assembled bracket assembly 500, the nesting of the cover 100 with the walled enclosure 200 is clearly visible, with the mounting flange portions of each component 102 and 202, respectively, forming a single combined bilaminate flange 501 with three sets of composite mounting holes formed from 103A/203A, 103B/203B, and 103C/203C. Alignment of the rectangular bolt receiving openings 105 and 205 in the cover and walled enclosure, respectively, will also be noted.

Referring now to the see-through views of FIGS. 7 through 10, it will be noted that a cavity or chamber 701 is formed by the nesting of the cover 100 with the walled enclosure 200. A reed switch 702 and an associated magnet 703 are adhesively attached to either the bolt receiving portion 102 of the cover 100 or the bolt receiving portion 202 of the walled enclosure 200. The switch 702 and magnet 703 are installed on opposite sides of the rectangular openings 105 and 205, so that when a bolt (see FIG. 13) is slidably inserted through the door track rail (see FIGS. 11 through 13) and through the rectangular openings 105 and 205, the bolt interferes with the magnetic field generated by the magnet 703. When the bolt is withdrawn from the rail to open the door, the reed switch 702 senses the magnetic field of the magnet 703 and either closes (if a normally-open switch) or opens (if a normally-closed switch), thereby generating a signal which triggers a security alert.

Figure 11:
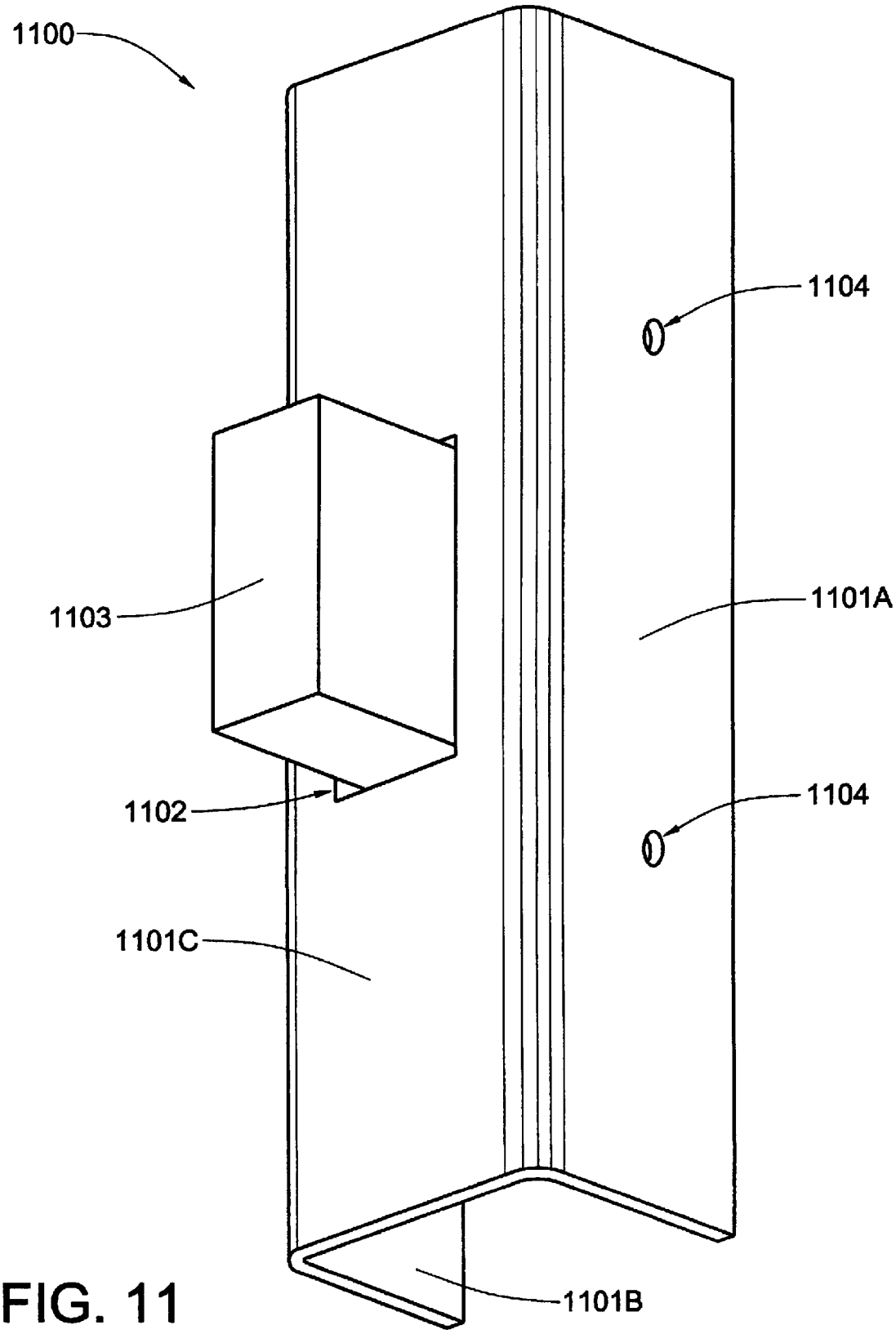
FIG. 11 is an isometric view of a section of a track rail for an overhead-opening door.

Referring now to FIG. 11, a rail 1100 of the type commonly used to guide the movement of overhead opening doors is shown. The rail 1100 is made of sheet steel and formed as a channel having a U-shaped cross section by stamping. The channel-shaped rail has two substantially planar side panels 1101A and 1101B, each of which is connected to a central panel 1101C via a 90-degree bend. The central panel 1101C has a rectangular opening 1102 stamped or cut therein for receiving a horizontally movable rectangular locking bolt 1103 affixed to the door (not shown). Two holes 1104 have been drilled and tapped (i.e., threaded) in panel 1101A. The bracket assembly 500 will be secured to panel 1101A with screws threadably inserted in holes 1104.

Figure 12:
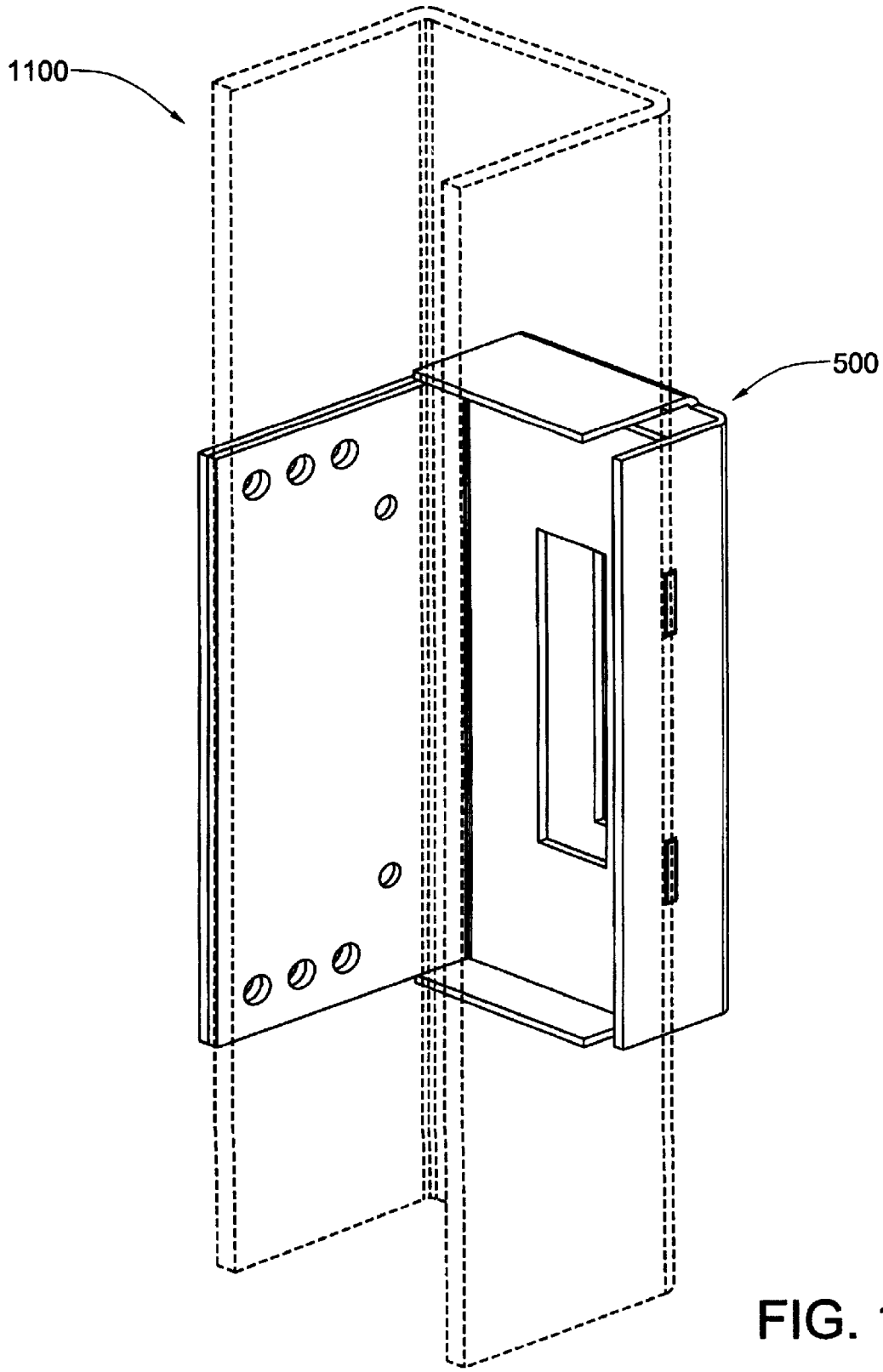
FIG. 12 is a fully-assembled bracket assembly, in combination with a door track rail (shown as a broken-line ghost image), the assembly being positioned for exemplary mounting thereof on said rail.
Figure 13:
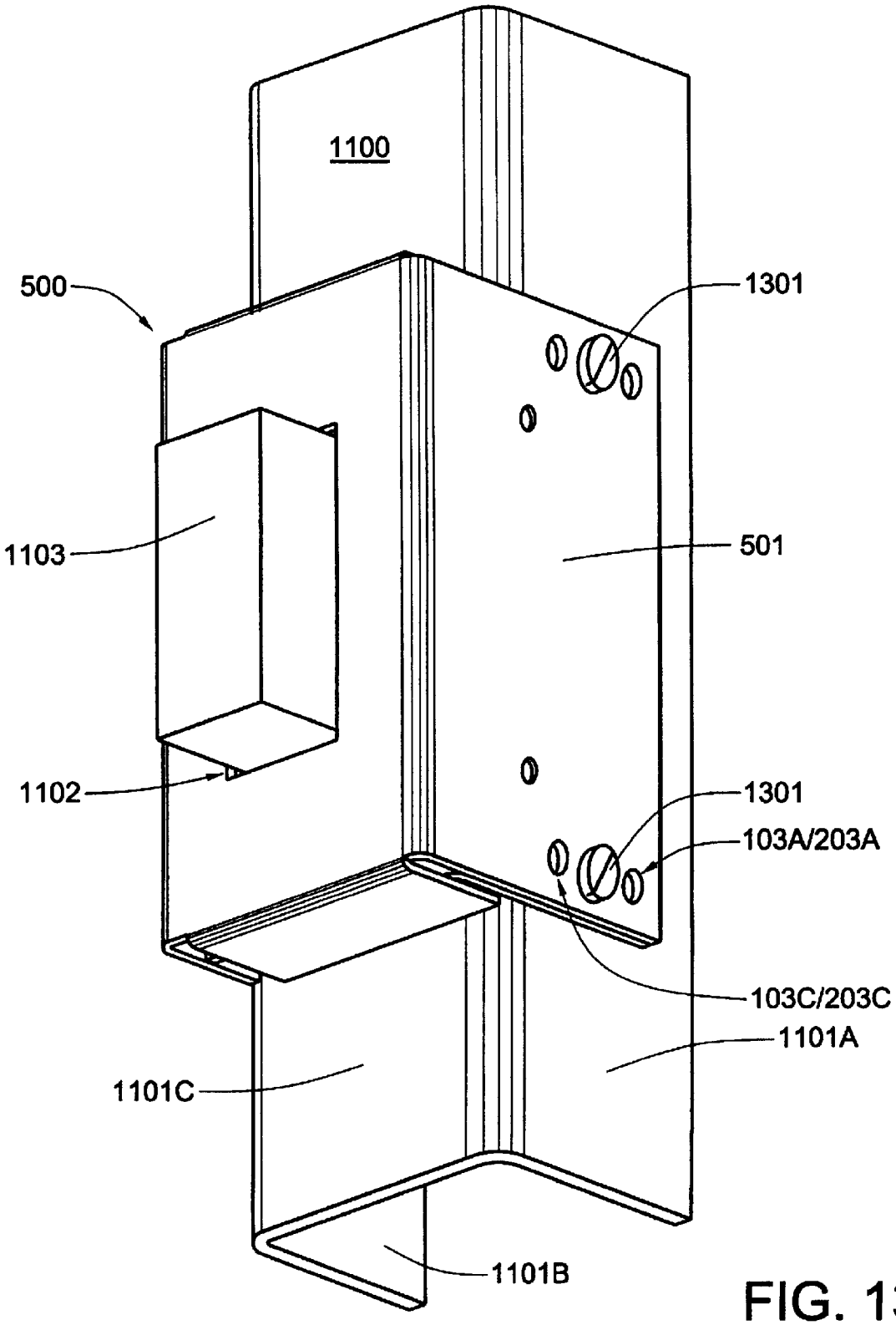
FIG. 13 is an isometric view of a bracket assembly fasted on a door track rail.

Referring now to FIGS. 12 and 13, mounting of the completely assembled bracket assembly 500 on door track rail of U-shaped cross section 1201 may be more completely understood. The combined mounting flange 501 mounts on an outer surface of one of the side panels 1101A or 1101B of the track rail 1100 by means of two screws 1301 which pass through one of the sets of composite holes 103A/203A, 103B/203B, and 103C/203C (in this particular case, holes 103B/203B are employed) and are threadably inserted in holes 1104 in rail 1100.

It should be readily apparent from the above descriptions, that the new bracket assembly is capable of providing secure mounting of a reed switch and an associated magnet on the rail of an overhead-opening door in a compact package that protects the enclosed components from mechanical damage, that is inexpensively manufacturable, and simple to service.

Although only a single embodiments of the bracket assembly is disclosed herein, it will be obvious to those having ordinary skill in the art that changes and modifications may be made thereto without departing from the scope and the spirit of having ordinary skill in the art that changes and modifications may be made thereto the invention as hereinafter claimed.

What is claimed is:

1. A security switch assembly comprising:

an enclosure made of non-ferromagnetic material mountable to a sliding door track rail having a bolt-receiving aperture therein, said enclosure having at least one opening therein, alignable with said aperture, through which a ferromagnetic locking bolt, which has engaged said aperture, may be [reversably] *reversibly* inserted;

a reed switch and a magnet, both of which are mounted within said enclosure, said switch and said magnet being positioned sufficiently near one another on opposite sides of said opening so that the locking bolt, when inserted through said opening, prevents the magnetic field generated by the magnet from acting on the reed switch*; and*

*means for mounting the switch assembly on a rail of a sliding door track such that said at least one opening in said enclosure is aligned with a bolt-receiving aperture in said rail, said means comprising a mounting flange portion and a bolt receiving portion that facilitates mounting of said enclosure to at least a side of said door track rail.*

2. The security switch assembly of claim 1, wherein both the reed switch and the magnet are each enclosed within a package, both packages being bonded to an inner surface of said chamber.

3. The security switch assembly of claim 1, wherein said enclosure comprises first and second pieces which nest and [reversably] *reversibly* snap together.

4. The security switch assembly of claim 3, wherein portions of each of said first and second pieces overlap to form a bilaminate flange that is attachable to the door track rail.

5. The security switch assembly of claim 3, wherein said first and second pieces are stamped from sheet aluminum.

6. The security switch assembly of claim 1, wherein said enclosure has a gap through which connection wires for the reed switch may be routed.

7. A bracket assembly containing a reed switch and an associated magnet, said assembly being mountable on a door track rail, said assembly comprising:

a walled enclosure formed from stamped sheet metal having a mounting flange portion couple to a bolt receiving portion with about a 90-degree bend, said mounting flange portion having at least one mounting hole by means of which the assembly may be secured to the rail with at least one fastener, said bolt receiving portion having an opening through which a slidable locking bolt may be [reversably] *reversibly* inserted to prevent the magnetic field generated by the magnet from acting on the reed switch; and a cover also formed from stamped sheet metal and having a mounting flange portion couple to a bolt receiving portion via about a 90-degree bend, said cover nesting with said enclosure to form a chamber in which the reed switch and the magnet are affixed to an interior surface, the mounting flange portion of said cover also having at least one mounting hole coaxial with said at least one mounting hole in said enclosure, the bolt receiving portion of said cover also having and opening aligned with the opening of said enclosure, said pair of openings providing a path through which a slidable locking bolt may be [reversably] *reversibly* inserted to prevent the magnetic field generated by the magnet from acting on the reed switch.

8. The bracket assembly of claim 7, wherein said walled enclosure and said cover snap together, thereby [reversably] *reversibly* interlocking.

9. The bracket assembly of claim 7, wherein said chamber has a gap through which wires for the reed switch may be routed.

10. The bracket assembly of claim 7, wherein said sheet metal is non-ferromagnetic.

11. The bracket assembly of claim 10, wherein said non-ferromagnetic metal contains aluminum.

12. The bracket assembly of claim 7, wherein said reed switch and said magnet are affixed to the chamber on opposite sides of said path.

13. A switch assembly comprising:

an enclosure formed by a pair of snap-together pieces, said enclosure having at least one opening through which a slidable locking bolt for a sliding door may be [reversably] *reversibly* inserted;

a reed switch mounted within said enclosure adjacent the opening;

a magnet generating a magnetic field, which acts on said reed switch, said magnet being mounted within said enclosure adjacent the opening, but with the opening between it and the reed switch; and means for mounting the switch assembly on a rail of a sliding door track such that said at least one opening in said enclosure is aligned with a bolt-receiving aperture in said rail.

14. The switch assembly of claim 13, wherein said snap-together pieces are stamped from a non-ferromagnetic material.

15. The switch assembly of claim 14, wherein said non-ferromagnetic material contains aluminum.

16. The switch assembly of claim 13, wherein said reed switch and said magnet are adhesively bonded to an inner surface of said enclosure.

17. The switch assembly of claim 13, wherein said snap-together pieces include:

a walled enclosure having a pair of slots and a pair of apertures; and a cover having a pair of tabs which mate with the slots in said walled enclosure and a pair of protrusions which mate with said apertures.

18. The switch assembly of claim 17, wherein said means for mounting include a rail mounting flange on each of said walled enclosure and on said cover, both flanges having at least one mounting hole which are coaxial when the cover is nested within the enclosure.

19. The switch assembly of claim 13, wherein said cover nests within said walled enclosure when the two pieces are snapped together.

*20. The security switch assembly of claim 1, wherein said enclosure is fashioned in an "L" shape permitting installation to at least a side of a rail of said sliding door track, thereby protecting said switch assembly.*

* * * * *